United States Patent
Sorkin

(10) Patent No.: US 10,655,358 B2
(45) Date of Patent: May 19, 2020

(54) BARRIER CABLE ANCHOR

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 297 days.

(21) Appl. No.: 15/724,713

(22) Filed: Oct. 4, 2017

(65) Prior Publication Data

US 2018/0094450 A1   Apr. 5, 2018

Related U.S. Application Data

(60) Provisional application No. 62/404,121, filed on Oct. 4, 2016.

(51) Int. Cl.
*E01F 15/06* (2006.01)
*E04H 17/06* (2006.01)
(Continued)

(52) U.S. Cl.
CPC .............. *E04H 17/10* (2013.01); *E01F 15/06* (2013.01); *E04H 17/06* (2013.01); *F16G 11/044* (2013.01)

(58) Field of Classification Search
CPC ...... E04F 11/1859; E04H 17/04; E04H 17/06; E04H 17/08; E04H 17/10; E04H 17/12; E04H 17/26; E04H 17/261; E04H 17/266; F16G 11/04; F16G 11/044; F16G 11/048; F16G 11/10; F16G 11/101; F16G 11/12; Y10T 24/3969; Y10T 24/3978; Y10T 24/3996; Y10T 403/7069; Y10T 403/76

(Continued)

(56) References Cited

U.S. PATENT DOCUMENTS 3,152,668 A * 10/1964 Smith ................... E04H 12/20
                                                                52/148
4,160,615 A    7/1979 Baldwin
(Continued)

FOREIGN PATENT DOCUMENTS

JP    2002227343 A    8/2002
JP    2011058574 A    3/2011

OTHER PUBLICATIONS

ENERPAC; Precision Sure-Lock; "Bartier Cable Products"; www.precision-surelock.com (1 page).
(Continued)

*Primary Examiner* — Josh Skroupa
(74) *Attorney, Agent, or Firm* — Adolph Locklar

(57) ABSTRACT

A barrier cable anchor for mechanically coupling a barrier cable to a barrier retaining structure comprises an anchor body comprising a mounting extension and an anchor body extension and including a radially extending mounting face, a retaining collar coupled to the anchor body extension and including a tapered inner surface, and one or more retaining wedges positioned within the retaining collar. The anchor body extension, mounting extension, and retaining collar may have bores therethrough. The retaining collar may include a threaded outer surface and the anchor body extension may include a threaded inner surface and the retaining collar may be threadedly coupled to the anchor body extension. The anchor may further comprise an anchor cap retained to the anchor body extension. The anchor cap may include a threaded inner surface and the retaining collar may be threadedly coupled to the anchor cap.

20 Claims, 2 Drawing Sheets

(51) Int. Cl.
*E04H 17/10* (2006.01)
*F16G 11/04* (2006.01)

(58) Field of Classification Search
USPC ............ 403/374.4, 409.1; 256/32, 37, 47, 256/DIG. 3; 24/115 M, 136 B, 136 R
See application file for complete search history.

(56) References Cited

U.S. PATENT DOCUMENTS

| | | | |
|---|---|---|---|
| 4,494,890 A * | 1/1985 | Lusk | H01B 17/38 |
| | | | 403/374.4 |
| 4,598,809 A | 7/1986 | Glover et al. | |
| 4,656,698 A * | 4/1987 | Arakawa | F16G 11/12 |
| | | | 24/136 R |
| 4,896,470 A | 1/1990 | Sorkin | |
| 5,015,023 A | 5/1991 | Hall | |
| 5,072,558 A | 12/1991 | Sorkin et al. | |
| 5,440,842 A | 8/1995 | Sorkin | |
| 5,701,707 A | 12/1997 | Sorkin | |
| 5,720,139 A | 2/1998 | Sorkin | |
| 5,749,185 A | 5/1998 | Sorkin | |
| 5,755,065 A | 5/1998 | Sorkin | |
| 5,770,286 A | 6/1998 | Sorkin | |
| 5,788,398 A | 8/1998 | Sorkin | |
| 5,839,235 A | 11/1998 | Sorkin | |
| 5,897,102 A | 4/1999 | Sorkin | |
| 6,012,867 A | 1/2000 | Sorkin | |
| 6,017,165 A | 1/2000 | Sorkin | |
| 6,023,894 A | 2/2000 | Sorkin | |
| 6,027,278 A | 2/2000 | Sorkin | |
| 6,098,356 A | 8/2000 | Sorkin | |
| 6,151,850 A | 11/2000 | Sorkin | |
| 6,176,051 B1 | 1/2001 | Sorkin | |
| 6,234,709 B1 | 5/2001 | Sorkin | |
| 6,381,912 B1 | 5/2002 | Sorkin | |
| 6,393,781 B1 | 5/2002 | Sorkin | |
| 6,513,287 B1 | 2/2003 | Sorkin | |
| 6,560,939 B2 | 5/2003 | Sorkin | |
| 6,631,596 B1 | 10/2003 | Sorkin | |
| 6,761,002 B1 | 7/2004 | Sorkin | |
| 6,817,148 B1 | 11/2004 | Sorkin | |
| 6,843,031 B1 | 1/2005 | Sorkin | |
| 7,424,792 B1 | 9/2008 | Sorkin | |
| 7,676,997 B1 | 3/2010 | Sorkin | |
| D615,219 S | 5/2010 | Sorkin | |
| 7,823,345 B1 | 11/2010 | Sorkin | |
| 7,841,061 B1 | 11/2010 | Sorkin | |
| 7,856,774 B1 | 12/2010 | Sorkin | |
| 7,866,009 B1 | 1/2011 | Sorkin | |
| 7,950,196 B1 | 5/2011 | Sorkin | |
| 8,015,774 B1 | 9/2011 | Sorkin | |
| 8,051,615 B2 | 11/2011 | Mathews et al. | |
| 8,065,845 B1 | 11/2011 | Sorkin | |
| 8,069,624 B1 | 12/2011 | Sorkin | |
| 8,087,204 B1 | 1/2012 | Sorkin | |
| 8,171,604 B2 * | 5/2012 | Lin | F16G 11/12 |
| | | | 24/68 R |
| 8,251,344 B1 | 8/2012 | Sorkin | |
| 8,276,334 B2 | 10/2012 | Mathews et al. | |
| 8,713,894 B2 | 5/2014 | Viereck et al. | |
| 9,097,014 B1 | 8/2015 | Sorkin | |
| 9,194,155 B2 * | 11/2015 | Landry | E04H 17/10 |
| 9,249,577 B2 * | 2/2016 | Ross | E04F 11/1859 |
| 9,976,320 B2 * | 5/2018 | Burt | E04F 11/1859 |
| 2015/0330078 A1 | 11/2015 | Sorkin | |
| 2018/0003202 A1 * | 1/2018 | White | F16G 11/04 |

OTHER PUBLICATIONS

Precision Sure-Lock; "Barrier Cable Products"; www.precision-surelock.com (2 pages).

Extended European Search Report issued in EP app. No. 17194718.7, dated Jan. 29, 2018 (8 pages).

* cited by examiner

BARRIER CABLE ANCHOR

CROSS-REFERENCE TO RELATED APPLICATIONS

This application is a non-provisional application which claims priority from U.S. provisional application No. 62/404,121, filed Oct. 4, 2016, which is incorporated by reference herein in its entirety.

TECHNICAL FIELD/FIELD OF THE DISCLOSURE

The present disclosure relates generally to mechanical anchors, and specifically to mechanical anchors for cables.

BACKGROUND OF THE DISCLOSURE

Barrier cable installations are restraint systems used in parking garages, along highways, and in other structures. Barrier cable installations typically include one or more barrier cables placed under tension to restrain movement of vehicles and pedestrians. The barrier cables are typically extended between structures such as columns or walls and are anchored thereto.

SUMMARY

The disclosure provides for a barrier cable anchor for mechanically coupling a barrier cable to a barrier retaining structure. The barrier cable anchor includes an anchor body, the anchor body comprising a mounting extension and an anchor body extension. The barrier cable anchor also includes a retaining collar, the retaining collar retained to the anchor body extension. The retaining collar includes a tapered inner surface. The barrier cable anchor also includes one or more retaining wedges positioned within the retaining collar.

The disclosure also provides for a barrier cable system. The barrier cable system includes a first barrier retaining structure and a second barrier retaining structure. Each barrier retaining structure includes an anchor plate, each anchor plate including at least one hole and a barrier cable anchor. The barrier cable anchor is positioned within the hole of the respective anchor plate. The barrier cable anchor couples a barrier cable end of a barrier cable to the respective barrier retaining structure. Each barrier cable anchor includes an anchor body, the anchor body comprising a mounting extension and an anchor body extension. The anchor body is positioned within the hole of the anchor retaining plate. Each barrier cable anchor also includes a retaining collar. The retaining collar is mechanically coupled to or integrally formed with the anchor body extension. The retaining collar includes a tapered inner surface. Each barrier cable anchor also includes one or more retaining wedges positioned within the retaining collar.

A method is also provided. The method includes providing a barrier retaining structure, wherein the barrier retaining structure is a column, wall, or post. The method also includes mechanically coupling an anchor plate to the barrier retaining structure, the anchor plate having a hole therethrough. In addition, the method includes assembling a barrier cable anchor. The assembling includes supplying an anchor body, the anchor body comprising a mounting extension and an anchor body extension. The assembling also includes mechanically coupling or integrally forming a retaining collar to the anchor body extension, the retaining collar including a tapered inner surface. The method further includes receiving one or more retaining wedges within the retaining collar and positioning the barrier cable anchor through the hole in the anchor plate. In addition, the method includes inserting a barrier cable end into the barrier cable anchor.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
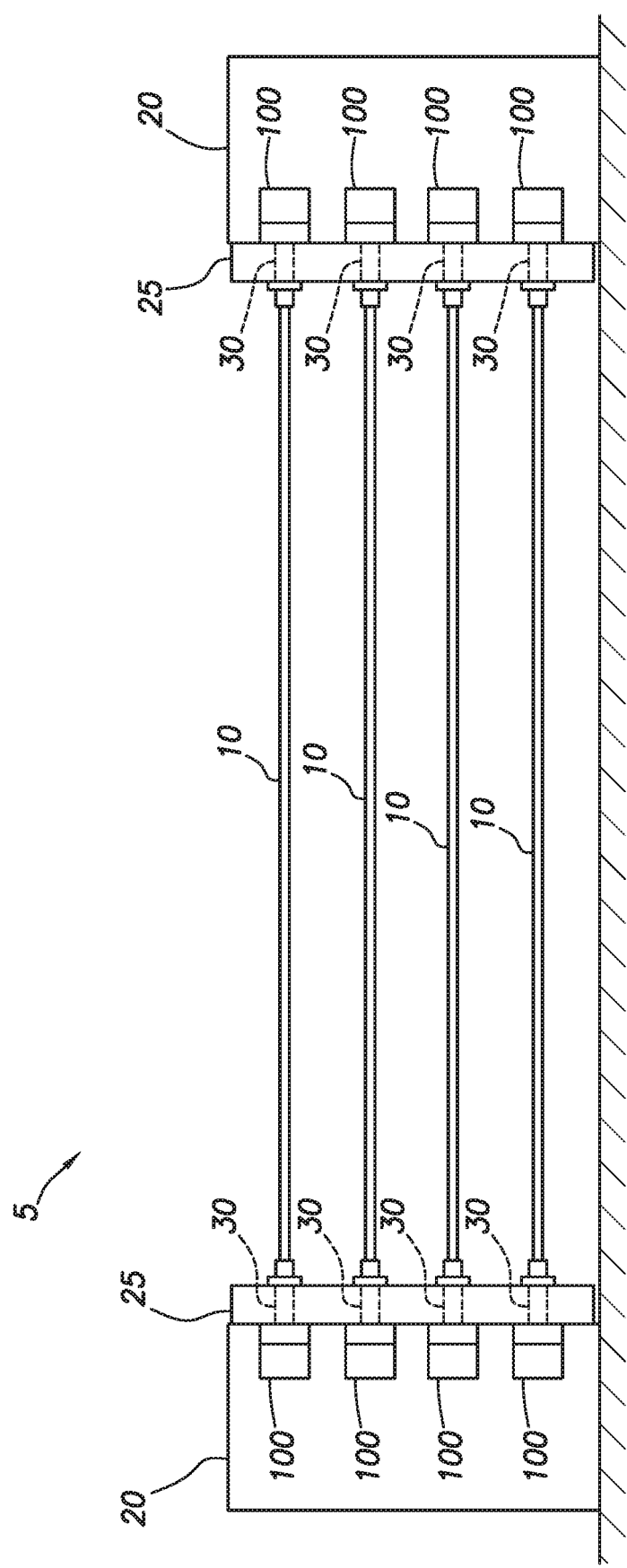
FIG. 1 depicts a barrier cable system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a barrier cable system 5. Barrier cable system 5 may include one or more barrier cables 10, barrier retaining structures 20, anchor plates 25, and barrier cable anchors 100. Barrier cables 10 may be formed of metal and may be placed under tension to restrain movement of vehicles and pedestrians. Barrier cables may extend between two or more barrier retaining structures 20. Examples of barrier retaining structures 20 may include, but are not limited to, columns, walls, or posts.

In some embodiments, barrier cables 10 may be mechanically coupled to barrier retaining structures 20 by barrier cable anchors 100. In some embodiments, barrier cable anchors 100 may each be mechanically coupled to a respective barrier retaining structure 20 by an anchor plate 25. Anchor plate 25 may be, for example and without limitation, a plate, bar, or cylinder. In some embodiments, anchor plate 25 may be constructed of metal or polymer. Although described herein as a plate, one having ordinary skill in the art with the benefit of this disclosure will understand that anchor plate 25 may be any structure for mounting barrier cable anchor 100 to barrier retaining structure 20, and may, for example and without limitation, be one or more pieces of rebar. Anchor plate 25 may be mechanically coupled to barrier retaining structure 20 by, for example and without limitation, mechanical fasteners such as bolts or welding. In other embodiments, anchor plate 25 may be integrally formed with barrier retaining structure 20. Anchor plate 25 may include one or more holes 30, each hole 30 positioned to receive a corresponding barrier cable anchor 100. In other embodiments, such as where barrier retaining structure 20 is formed from poured concrete, one or more barrier cable anchors 100 may be at least partially embedded into barrier retaining structure 20 as the concrete barrier retaining structure 20 is cast. In some embodiments, anchor retention plate 25 may likewise be at least partially embedded into barrier retaining structure 20, when, for example, barrier retaining structure 20 is constructed of concrete.

Figure 2:
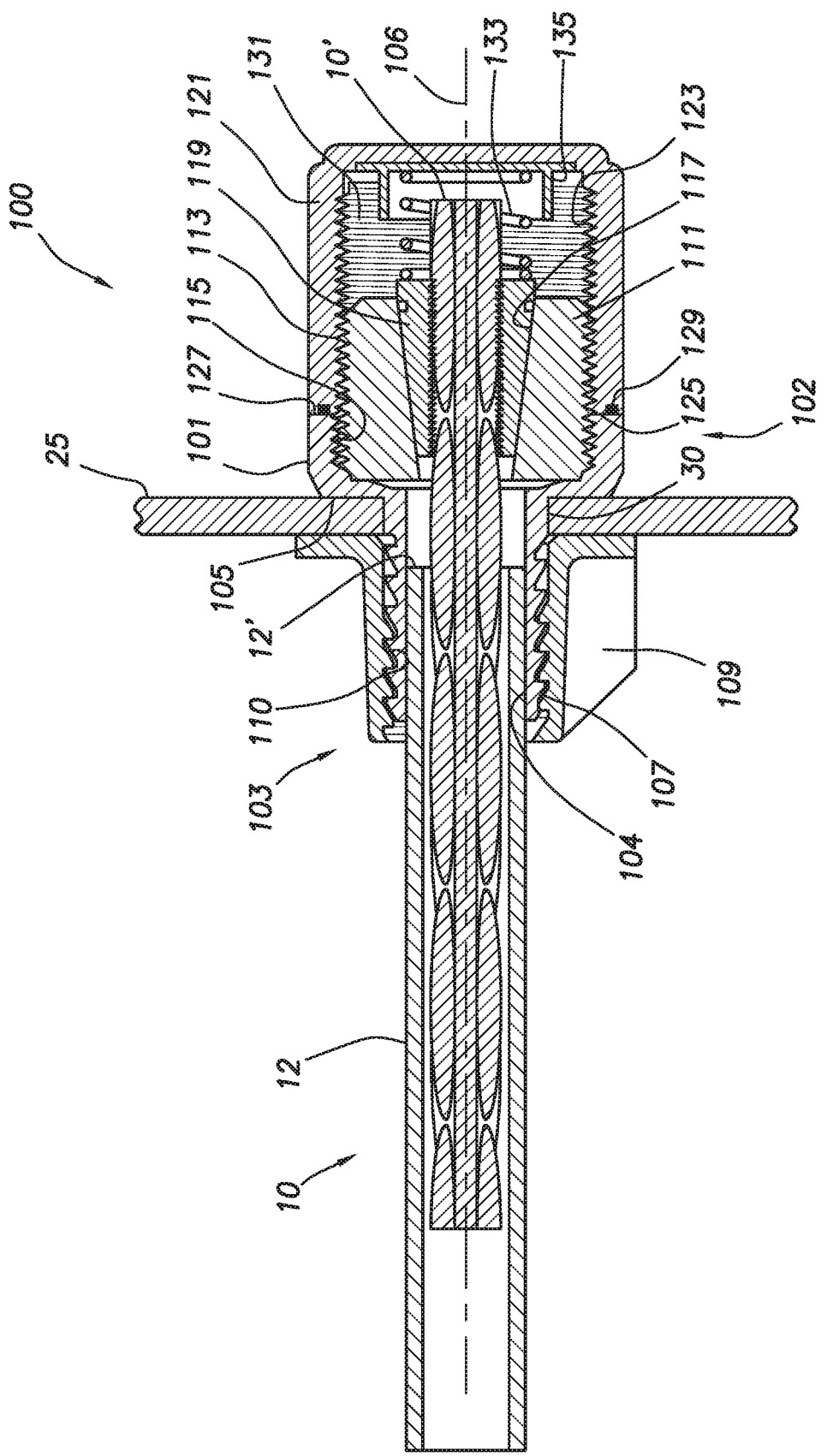
FIG. 2 depicts a cross section view of a barrier cable anchor consistent with at least one embodiment of the present disclosure.

In some embodiments, as depicted in FIG. 2, barrier cable anchor 100 may include an anchor body 101 having a longitudinal axis 106. Anchor body 101 may include an anchor body extension 102 and a mounting extension 103. Anchor body extension 102 may be a tube extending along longitudinal axis 106 of anchor body 101 and may be a barrel anchor or metal donut. Likewise, mounting extension 103 may also be a tube extending along longitudinal axis 106 of anchor body 101. Mounting extension 103 may be sized such that it is positionable within hole 30 in anchor plate 25. Mounting extension 103 may sometimes hereinafter be referred to as a connecting element.

In some embodiments, mounting extension 103 may join anchor body extension 102 at mounting face 105 of anchor body extension 102. Mounting face 105 may be an annular surface extending radially outward adjacent to mounting extension 103. In other embodiments, such as shown in FIG. 2, mounting extension 103 and anchor body extension 102 are a single piece. In other embodiments, mounting extension 103 and anchor body extension 102 are formed separately, in which case mounting extension 103 may be mechanically coupled to mounting face 105, such as by welding. Mounting face 105 may abut anchor plate 25. By abutting mounting face 105 against anchor plate 25, barrier cable anchor 100 may be prevented or retarded from moving through hole 30 of anchor plate 25.

In some embodiments, barrier cable anchor 100 may further include a mounting nut 109. In some embodiments, mounting nut 109 may engage mounting extension 103. As used herein, retain refers to, retention by, for example and without limitation, threading, pins, snaps, mechanical welding, a friction fit, or any similar type of closure known in the art. Mounting nut 109 may include internal threads 110. In some embodiments, mounting extension 103 may include threaded outer surface 107 adapted to receive mounting nut 109. Mounting nut 109 may be threaded with internal threads 110 onto mounting extension 103 until mounting nut 109 is in contact with anchor plate 25, thereby coupling barrier cable anchor 100 to anchor plate 25. In other embodiments, barrier cable anchor 100 may be coupled to anchor plate by tension on barrier cable 10 and may not be mechanically coupled thereto. In other embodiments, barrier cable anchor 100 may mechanically couple to anchor plate 25 by a fastener or other method of coupling known in the art including, for example and without limitation, one or more of pins, snaps, mechanical or chemical welding, screws, bolts, or a friction fit.

In some embodiments, mounting extension 103 may include an inner surface 104. Inner surface 104 of mounting extension 103 may be cylindrical. In some embodiments, inner surface 104 may receive cable end 10' of barrier cable 10 as barrier cable 10 is inserted into barrier cable anchor 100. In embodiments in which barrier cable 10 includes barrier cable sheath 12, sheath end 12' of barrier cable sheath 12 may be inserted into mounting extension 103, thereby contacting inner surface 104 of mounting extension 103. In some such embodiments, barrier cable sheath 12 may contact inner surface 104 and may, for example and without limitation, retard or reduce fluid ingress into anchor body extension 102 through mounting extension 103. In some embodiments in which barrier cable anchor 100 is embedded into a barrier retaining structure 20, barrier cable sheath 12 may, for example and without limitation, form a passage through barrier retaining structure 20 through which barrier cable 10 may pass. In some embodiments, barrier cable sheath 12 may be included as part of barrier cable anchor 100.

In some embodiments, barrier cable anchor 100 may include a retaining collar 111, which may have a bore therethrough. Retaining collar 111 may mechanically couple to anchor body extension 102, or, in some embodiments, be formed integrally with anchor body extension 102. In certain embodiments, retaining collar 111 may be retained to anchor body 101. For example, retaining collar 111 may include threaded outer surface 113 and may mechanically engage threaded inner surface 115 of anchor body extension 102 to threadedly mechanically couple retaining collar 111 to anchor body 101. In other embodiments, retaining collar 111 may not be mechanically coupled to anchor body 101 and may be retained thereto by tension in barrier cable 10. In other embodiments, retaining collar 111 may mechanically couple to anchor body 101 by any fastener or method of coupling known in the art including, for example and without limitation, one or more of pins, snaps, mechanical or chemical welding, screws, bolts, or a friction fit.

In some embodiments, retaining collar 111 may include a tapered inner surface 117. Tapered inner surface 117 may receive one or more retaining wedges 119. The diameter of tapered inner surface 117 may be smallest where retaining collar 111 is closest to mounting extension 103. While FIG. 2 depicts two retaining wedges 119, any number of retaining wedges 119 may be used, including a single retaining wedge 119 or three or more retaining wedges 119. As shown in FIG. 2, retaining wedges 119 may be tapered such that the taper of retaining wedges 119 corresponds to the taper of tapered inner surface 117. In some embodiments, each retaining wedge 119 may be formed generally in the shape of an annular sector. Retaining wedges 119 may be circumferentially positioned about tapered inner surface 117 within retaining collar 111.

In some embodiments, retaining wedges 119 may form at least a partially cylindrical space into which cable end 10' of barrier cable 10 may be inserted. Retaining wedges 119 may be used to retain cable end 10' of barrier cable 10 to anchor body extension 102 when cable end 10' of barrier cable 10 is inserted into retaining collar 111. Retaining wedges 119 may be tapered such that any tensile force applied to barrier cable 10 in a longitudinal direction away from barrier cable anchor 100 causes retaining wedges 119 to be pulled further into tapered inner surface 117 of retaining collar 111, increasing normal force on barrier cable 10, and therefore resisting the removal of barrier cable 10 from retaining collar 111.

In some embodiments, barrier cable anchor 100 may include an anchor cap 121. Anchor cap 121 may be a cap over an open end of anchor body extension 102 and may be of any shape, including, but not limited to cylindrical, square, rectangular, or hexagonal. In some embodiments, anchor cap 121 may be omitted. In certain embodiments, anchor cap 121 may include a lip. Anchor cap 121 may be retained to, such as by mechanical coupling, anchor body extension 102. In some embodiments, as depicted in FIG. 2, anchor cap 121 may include threaded inner surface 123 and may mechanically engage threaded outer surface 113 of retaining collar 111 to threadedly couple anchor cap 121 and retaining collar 111. In other embodiments, anchor cap 121 may mechanically couple to retaining collar 111 by any fastener or method of coupling known in the art including, for example and without limitation, one or more of pins, snaps, mechanical or chemical welding, screws, bolts, or a friction fit. In some embodiments, anchor cap 121 may include a mating face 125. Mating face 125 is an outside surface of anchor cap 121. Anchor cap 121 may be threaded onto retaining collar 111 until mating face 125 of anchor cap 121 is in contact with a corresponding mating face 127 of anchor body extension 102. Mating face 127 of anchor body extension 102 may be an outside surface of anchor body extension 102. In some embodiments, one or more seals may be positioned between anchor cap 121 and anchor body extension 102, such as O-ring 129 as depicted in FIG. 2. In some embodiments, anchor cap 121 may, for example and without limitation, sealingly couple to one or more of anchor body extension 102 and retaining collar 111 and may retard ingress of fluid into interior 131 of barrier cable anchor 100 defined by anchor cap 121.

In some embodiments, retaining wedges 119 may be urged into retaining collar 111 by a spring 133. Spring 133 may be positioned between retaining wedges 119 and anchor cap 121. In some embodiments, barrier cable anchor 100 may include a spring cap 135 positioned between spring 133 and anchor cap 121 to, for example and without limitation, maintain the position of spring 133 relative to anchor cap 121 during installation. In some embodiments, spring cap 135 may be formed as part of anchor cap 121 or may be formed as a separate component of barrier cable anchor 100. In some embodiments, spring cap 135 may be a cylinder. In certain embodiments, spring cap 135 may be omitted.

In some embodiments, one or more of anchor body 101, mounting nut 109, retaining collar 111, anchor cap 121, and spring cap 135 may be formed from plastic. In some embodiments, one or more of anchor body 101, mounting nut 109, retaining collar 111, retaining wedges 119, anchor cap 121, spring 133, and spring cap 135 may be formed from metal.

In some embodiments, barrier cable anchor 100 may be assembled prior to installation to barrier retaining structure 20 or anchor plate 25. In other embodiments, anchor body 101 may be installed to barrier retaining structure 20 or anchor plate 25 first, with the remaining components of barrier cable anchor 100 added to anchor body 101 thereafter.

In some embodiments, barrier cable anchor 100 may be installed to barrier retaining structure 20 prior to or after barrier retaining structure 20 is in place.

For example, in some embodiments in which barrier retaining structure 20 is a column, wall, or post that includes anchor plate 25 coupled thereto or formed integrally therewith, barrier cable anchor 100 may be installed thereto by inserting mounting extension 103 through hole 30 in anchor plate 25, and mounting nut 109 may be mechanically secured thereto.

In an embodiment in which barrier retaining structure 20 is formed on site, such as a poured concrete column, one or both of barrier cable anchor 100 and anchor plate 25 may be integrally cast into barrier retaining structure 20, or anchor plate 25 may be mechanically coupled to barrier retaining structure 20 after barrier retaining structure 20 is formed. In an embodiment in which both barrier cable anchor 100 and anchor plate 25 are integrally cast into barrier retaining structure 20, anchor plate 25 may form part of the concrete form used to cast barrier retaining structure 20. Barrier cable anchor 100 may be installed through hole 30 as discussed herein above, and concrete may be placed into the form. In other embodiments, hole 30 may be formed in the concrete form used to cast barrier retaining structure 20, and barrier cable anchor 100 may be coupled thereto. Casting of barrier retaining structure 20 may secure barrier cable anchor 100 thereto.

Once barrier cable anchor 100 is mechanically coupled to barrier retaining structure 20, barrier cable 10 may be mechanically coupled to barrier cable anchor. Cable end 10' of barrier cable 10 may be inserted into barrier cable anchor 100 such that cable end 10' enters retaining collar 111, engaging retaining wedges 119, thereby retaining end 10' of barrier cable 10 to barrier cable anchor 100, and thereby mechanically coupling barrier cable 10 to barrier retaining structure 20. Such a process may be repeated with a second barrier cable anchor positioned on a second barrier retaining structure 20 to secure the other end of barrier cable 10 thereto.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A barrier cable anchor for mechanically coupling a barrier cable to a barrier retaining structure comprising:
    an anchor body, the anchor body comprising a mounting extension and an anchor body extension, wherein the anchor body extension includes a radially extending mounting face adjacent to the mounting extension;
    a retaining collar, the retaining collar mechanically coupled to or integrally formed with the anchor body extension, the retaining collar including a tapered inner surface having a diameter, wherein the diameter of the tapered inner surface decreases in the direction of the mounting extension; and
    one or more retaining wedges positioned within the retaining collar.

2. The barrier cable anchor of claim 1 wherein the anchor body extension, mounting extension, and retaining collar have bores therethrough, the bores having a common axis.

3. The barrier cable anchor of claim 1 wherein the retaining collar includes a threaded outer surface and the anchor body extension includes a threaded inner surface, and wherein the retaining collar is threadedly coupled to the anchor body extension.

4. The barrier cable anchor of claim 3, further including a mounting nut engaging the mounting extension.

5. The barrier cable anchor of claim 1, further comprising an anchor cap, the anchor cap retained to the anchor body extension.

6. The barrier cable anchor of claim 5 wherein the retaining collar includes a threaded outer surface and the anchor cap includes a threaded inner surface and wherein the retaining collar is threadedly coupled to the anchor cap.

7. The barrier cable anchor of claim 5 wherein the anchor cap further comprises a mating face and the anchor body further comprises a mating face, the mating face of the anchor cap and the mating face of the anchor body surface are in contact.

8. The barrier cable anchor of claim 7, further comprising an O-ring positioned between the mating face of the anchor cap and the mating face of the anchor body.

9. The barrier cable anchor of claim 5, further comprising a spring positioned between the one or more retaining wedges and the anchor cap.

10. The barrier cable anchor of claim 9, further comprising a spring cap positioned between the spring and the anchor cap.

11. A barrier cable system comprising:
   a first barrier retaining structure and a second barrier retaining structure, each barrier retaining structure including;
   an anchor plate, each anchor plate including at least one hole therethrough; and
   a barrier cable anchor, the barrier cable anchor positioned within the hole of the respective anchor plate, the barrier cable anchor coupling a barrier cable end of a barrier cable to the respective barrier retaining structure, each barrier cable anchor including:
      an anchor body, the anchor body comprising a mounting extension an anchor body extension, wherein the anchor body extension includes a radially extending mounting face adjacent to the mounting extension, wherein the anchor body is positioned such that the mounting face abuts the respective anchor plate and the mounting extension extends through the hole of the anchor plate;
      a retaining collar, the retaining collar mechanically coupled to or integrally formed with the anchor body extension, the retaining collar including a tapered inner surface having a diameter, wherein the diameter of the tapered inner surface decreases in the direction of the mounting extension; and
      one or more retaining wedges positioned within the retaining collar.

12. The barrier cable system of claim 11 wherein the anchor body and retaining collar have bores therethrough, the bores having a common axis.

13. The barrier cable system of claim 11 wherein the retaining collar includes a threaded outer surface and the anchor body extension includes a threaded inner surface and wherein the retaining collar is threadedly coupled to the anchor body.

14. The barrier cable system of claim 11 wherein the mounting extension extends through the hole of the anchor plate.

15. The barrier cable system of claim 14 wherein the mounting extension further includes a threaded outer surface, further including a mounting nut mechanically coupled to the threaded outer surface.

16. The barrier cable system of claim 11, wherein the barrier cable anchor further comprises an anchor cap, the anchor cap retained to the anchor body extension.

17. The barrier cable system of claim 16, wherein the retaining collar includes a threaded outer surface and the anchor cap includes a threaded inner surface and wherein the retaining collar is threadedly coupled to the anchor cap.

18. The barrier cable system of claim 17, wherein the barrier cable anchor further comprises a spring positioned between the retaining wedges and the anchor cap.

19. A method comprising:
   a) providing a barrier retaining structure, wherein the barrier retaining structure is a column, wall, or post;
   b) mechanically coupling an anchor plate to the barrier retaining structure, the anchor plate having a hole therethrough;
   c) assembling a barrier cable anchor comprising the steps of:
      i) providing an anchor body, the anchor body comprising a mounting extension, an anchor body extension, and a radially extending mounting face adjacent to the mounting extension;
      ii) providing a retaining collar that is mechanically coupled to or integrally formed with the anchor body extension, the retaining collar including a tapered inner surface having a diameter, wherein the diameter of the tapered inner surface decreases in the direction of the mounting extension; and
      iii) positioning one or more retaining wedges within the retaining collar;
   d) positioning the barrier cable anchor such that the mounting face abuts the respective anchor plate and the mounting extension extends through the hole in the anchor plate; and
   e) inserting a barrier cable end into the barrier cable anchor until it engages the wedges.

20. The method of claim 19, wherein the mounting extension has an external threaded surface, the method further comprising prior to step e):
   providing a mounting nut, the mounting nut having internal threads; and
   threading the mounting nut onto the mounting extension;
   whereby the anchor plate is captured between the mounting face and the mounting nut.

* * * * *